United States Patent
Farmer et al.

(10) Patent No.: US 6,853,898 B2
(45) Date of Patent: Feb. 8, 2005

(54) OCCUPANT LABELING FOR AIRBAG-RELATED APPLICATIONS

(75) Inventors: Michael E. Farmer, West Bloomfield, MI (US); James M. Slicker, West Bloomfield, MI (US)

(73) Assignee: Eaton Corporation, Cleveland, OH (US)

( * ) Notice: Subject to any disclaimer, the term of this patent is extended or adjusted under 35 U.S.C. 154(b) by 43 days.

(21) Appl. No.: 10/269,308

(22) Filed: Oct. 11, 2002

(65) Prior Publication Data

US 2003/0135346 A1 Jul. 17, 2003

Related U.S. Application Data

(63) Continuation-in-part of application No. 10/052,152, filed on Jan. 17, 2002, now Pat. No. 6,662,093, which is a continuation-in-part of application No. 10/023,787, filed on Dec. 17, 2001, which is a continuation-in-part of application No. 10/006,564, filed on Nov. 5, 2001, now Pat. No. 6,577,936, which is a continuation-in-part of application No. 09/901,805, filed on Jul. 10, 2001, which is a continuation-in-part of application No. 09/870,151, filed on May 30, 2001, now Pat. No. 6,459,974.

(51) Int. Cl.[7] ................................................. G06F 7/00
(52) U.S. Cl. ........................... 701/45; 280/735; 180/169
(58) Field of Search .............................. 70/28, 45, 46; 180/169; 280/734, 735; 340/438

(56) References Cited

U.S. PATENT DOCUMENTS

| 4,179,696 A | 12/1979 | Quesinberry et al. |
| 4,625,329 A | 11/1986 | Ishikawa et al. |
| 4,985,835 A | 1/1991 | Sterler et al. |
| 5,051,751 A | 9/1991 | Gray |
| 5,074,583 A | 12/1991 | Fujita et al. |
| 5,229,943 A | 7/1993 | Eigler et al. |
| 5,256,904 A | 10/1993 | Tohbaru |
| 5,366,241 A | 11/1994 | Kithil |

(List continued on next page.)

FOREIGN PATENT DOCUMENTS

| JP | 61-66905 | 6/1994 |
| JP | 61-66906 | 6/1994 |
| WO | WO02/30717 | 4/2002 |

OTHER PUBLICATIONS

Greg Welch and Gary Bishop, "An Introduction to the Kalman Filter", Sep. 4, 1997.
"GPS–Based Vehicle Tracking" by Jeffrey Pusan from www.securitydriver.com/alc/stories/article–97.html.

Primary Examiner—Gertrude A. Jeanglaude
(74) Attorney, Agent, or Firm—Rader, Fishman & Grauer PLLC

(57) ABSTRACT

An invention is disclosed to divide a segmented image of an occupant into an upper torso image and a lower torso image. An occupant labeling heuristic can identify each pixel within the segmented image as an upper torso pixel or a lower torso pixel. A k-means module can provide an initial pixel classification by comparing the distance between the particular pixel and an estimated midpoint on the upper torso with the distance between the particular pixel and an estimated midpoint on the lower torso. The iterative parameters estimator can update the mean values for the upper torso and lower torso by performing a conditional likelihood heuristic. Pixels can then be classified as either upper or lower torso pixels by comparing a Mahalonobis distance for each torso. Airbag-related applications can then use the upper torso image to generate occupant characteristics relevant to airbag-related applications.

25 Claims, 4 Drawing Sheets

U.S. PATENT DOCUMENTS

| | | | |
|---|---|---|---|
| 5,398,185 A | 3/1995 | Omura | |
| 5,413,378 A | 5/1995 | Steffens, Jr. et al. | |
| 5,446,661 A | 8/1995 | Gioutsos et al. | |
| 5,490,069 A | 2/1996 | Gioutsos et al. | |
| 5,528,698 A | 6/1996 | Kamei et al. | |
| 5,890,085 A | 3/1999 | Corrado et al. | |
| 5,983,147 A * | 11/1999 | Krumm | 701/45 |
| 6,005,958 A | 12/1999 | Farmer et al. | |
| 6,018,693 A | 1/2000 | Blackburn et al. | |
| 6,026,340 A | 2/2000 | Corrado et al. | |
| 6,116,640 A | 9/2000 | Tanaka et al. | |
| 6,198,998 B1 | 3/2001 | Farmer et al. | |
| 6,203,059 B1 * | 3/2001 | Mazur et al. | 280/735 |
| 6,272,411 B1 | 8/2001 | Corrado et al. | |
| 6,324,453 B1 * | 11/2001 | Breed et al. | 701/45 |
| 6,459,974 B1 | 10/2002 | Baloch et al. | |
| 6,577,936 B2 | 6/2003 | Farmer | |
| 6,662,093 B2 | 12/2003 | Farmer | |
| 2003/0016845 A1 | 1/2003 | Farmer | |
| 2003/0031345 A1 | 2/2003 | Farmer | |
| 2003/0123704 A1 | 7/2003 | Farmer et al. | |
| 2003/0133595 A1 | 7/2003 | Farmer et al. | |
| 2003/0234519 A1 | 12/2003 | Farmer | |

* cited by examiner

US 6,853,898 B2

OCCUPANT LABELING FOR AIRBAG-RELATED APPLICATIONS

RELATED APPLICATIONS

This Continuation-In-Part application claims the benefit of the following U.S. utility applications: "A RULES-BASED OCCUPANT CLASSIFICATION SYSTEM FOR AIRBAG DEPLOYMENT," Ser. No. 09/870,151, filed on May 30, 2001, now U.S. Pat. No. 6,459,974; "IMAGE PROCESSING SYSTEM FOR DYNAMIC SUPPRESSION OF AIRBAGS USING MULTIPLE MODEL LIKELIHOODS TO INFER THREE DIMENSIONAL INFORMATION," Ser. No. 09/901,805, filed on Jul. 10, 2001; "IMAGE PROCESSING SYSTEM FOR ESTIMATING THE ENERGY TRANSFER OF AN OCCUPANT INTO AN AIRBAG," Ser. No. 10/006,564, filed on Nov. 5, 2001, now U.S. Pat. No. 6,577,936; "IMAGE SEGMENTATION SYSTEM AND METHOD," Ser. No. 10/023,787, filed on Dec. 17, 2001; and "IMAGE PROCESSING SYSTEM FOR DETERMINING WHEN AN AIRBAG SHOULD BE DEPLOYED," Ser. No. 10/052,152, filed on Jan. 17, 2002, now U.S. Pat. No. 6,662,093, the contents of which are hereby by incorporated by reference in their entirety.

BACKGROUND OF THE INVENTION

The present invention relates in general to systems or methods relating to the deployment of airbags. In particular, the present invention relates to identifying the upper torso of an occupant so that characteristics relating to the upper torso of the occupant can serve as the basis for making decisions relating to the potential deployment of an airbag.

Conventional collision detection systems typically use accelerometers or weight-based sensors to determine if there has been a vehicle collision to trigger the deployment of an airbag. Such systems are subject to false alarms from severe road conditions, such as a vehicle sliding on ice that then bumps into a curb, and minor impacts, such as the accidental hitting of a parking block while entering a parking lot. It would be desirable for an airbag deployment system to be based on occupant characteristics derived from an image of the occupant because the image of an occupant can be less susceptible to errors caused by rapidly shifting movement or weight.

Airbag deployment systems must perform their functions in a real-time environment. Even a standard video camera can capture as many as 100 images in a single second. Thus, the process from the capturing of a sensor reading or image through the making of a deployment decision must be performed in a prompt and reliable manner. It can be desirable for airbag-related image processing to focus on the upper torso of the occupant. In most airbag deployment situations, the part of the occupant exhibiting the most movement is the upper torso of the occupant. Upper torso movement dominates even in situations where an occupant is not restrained by a seatbelt, with the head moving forward quickly as the upper torso rotates forward along the hip.

Given the constraints of time, airbag deployment systems should be robust to facilitate reliable processing. In order to facilitate resistance to process "noise," it would be desirable for the process of identifying the upper torso image of the occupant to incorporate iterative processing and a probability-weighted analysis. It can also be desirable for anthropomorphic data as well as information relating the vehicle to be incorporated into certain assumptions made at various points in the process of identifying the upper torso image, or throughout the process of capturing images through generating deployment decisions.

SUMMARY OF THE INVENTION

This invention relates to a system and method using to determine which pixels in the segmented image of the occupant represent the upper torso image of the occupant.

Characteristics of the upper torso of the occupant can be used in many different ways by applications related to airbag deployment (e.g. airbag-related applications). The capturing of upper torso characteristics can be facilitated by isolating the upper torso image of an occupant from an image of the occupant that includes the lower torso.

The system can use anthropomorphic data, vehicle-specific data, previous midpoint calculations, and other means for creating an initial estimates for the midpoints of the upper torso and lower torso. A k-metric module can then be used for updating those estimates by implementing a heuristic that compares the distance in pixels from various pixels to the midpoints of the upper torso and lower torso.

A parameter estimator can then be used to further refine the updated midpoints for the upper torso and lower torso. In a preferred embodiment, the parameter estimator processes iteratively using one or more different mathematical heuristics that incorporate probability into the analysis.

The final midpoints for a particular segmented image can be used to calculate a Mahalanobis distance between a particular pixel and the midpoints for the upper and lower torsos. If the upper torso Mahalanobis distance is smaller than the lower torso Mahalanobis for a particular pixel, then that particular pixel can be identified as an upper torso pixel.

Various aspects of this invention will become apparent to those skilled in the art from the following detailed description of the preferred embodiment, when read in light of the accompanying drawings.

DETAILED DESCRIPTION OF A PREFERRED EMBODIMENT

A. Partial View of Surrounding Environment

Figure 1:
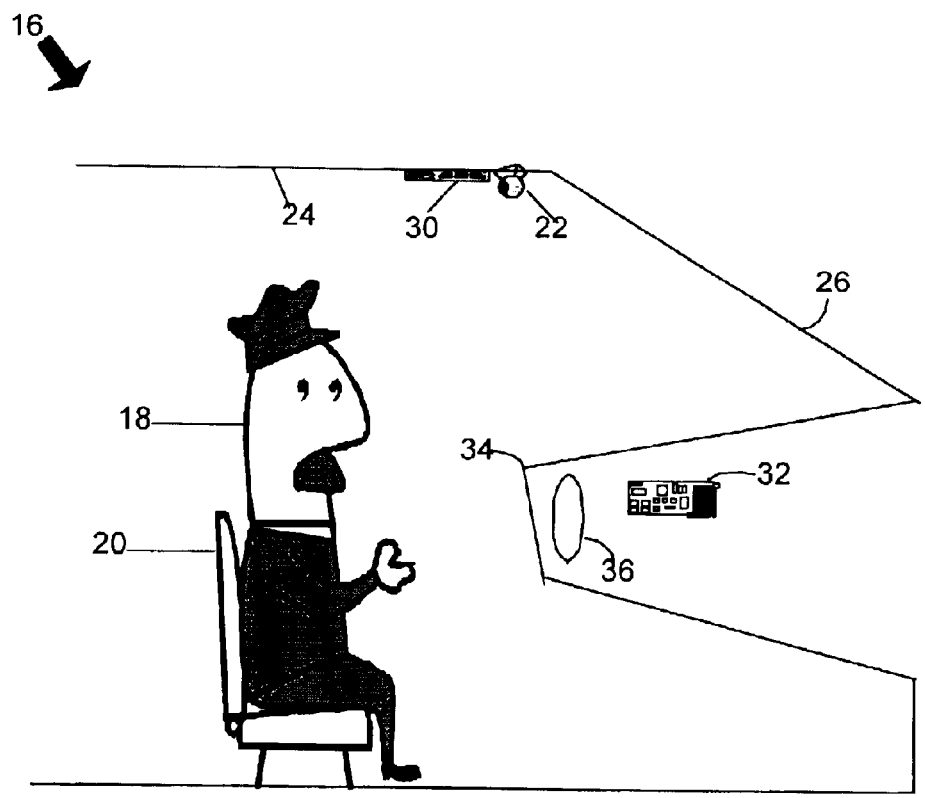
FIG. 1 shows one example of a partial view of the surrounding environment for one potential embodiment of the system.

Referring now to the drawings, illustrated in FIG. 1 is a partial view of the surrounding environment for one potential embodiment of the invention, an occupant labeling system 16. If an occupant 18 is present, the occupant 18 sits on a seat 20. In a preferred embodiment, a camera or other imaging sensor 22 (collectively "camera") capable of rapidly capturing a series of images is attached in a roof liner 24, above the occupant 18 and in a position closer to a front windshield 26 than the occupant 18. The camera 22 could be a standard video camera, but for crash detection purposes, a high speed camera 22 capable of capturing between 250 and 1000 frames per second may be preferable. The camera 22 should preferably be placed in a slightly downward angle towards the occupant 18 in order to capture changes in the angle and position of the occupant's 18 upper torso resulting from forward or backward movement in the seat 20. There are many other potential locations for a camera 22 that can be incorporated into the system 16. Similarly, a computer 30 could be located virtually anywhere on a vehicle. In a preferred embodiment, the computer 30 is located near the camera 22 to avoid sending camera images through long wires. An airbag controller 32 is shown in an instrument panel 34, although the airbag controller could be located virtually anywhere in the vehicle. An airbag deployment system 36 is shown in the instrument panel 34 in front of the occupant 18 and the seat 20, although the system 16 can function with the airbag deployment system 36 in alternative locations.

B. High Level Process Flow of Airbag Processing

Figure 2:
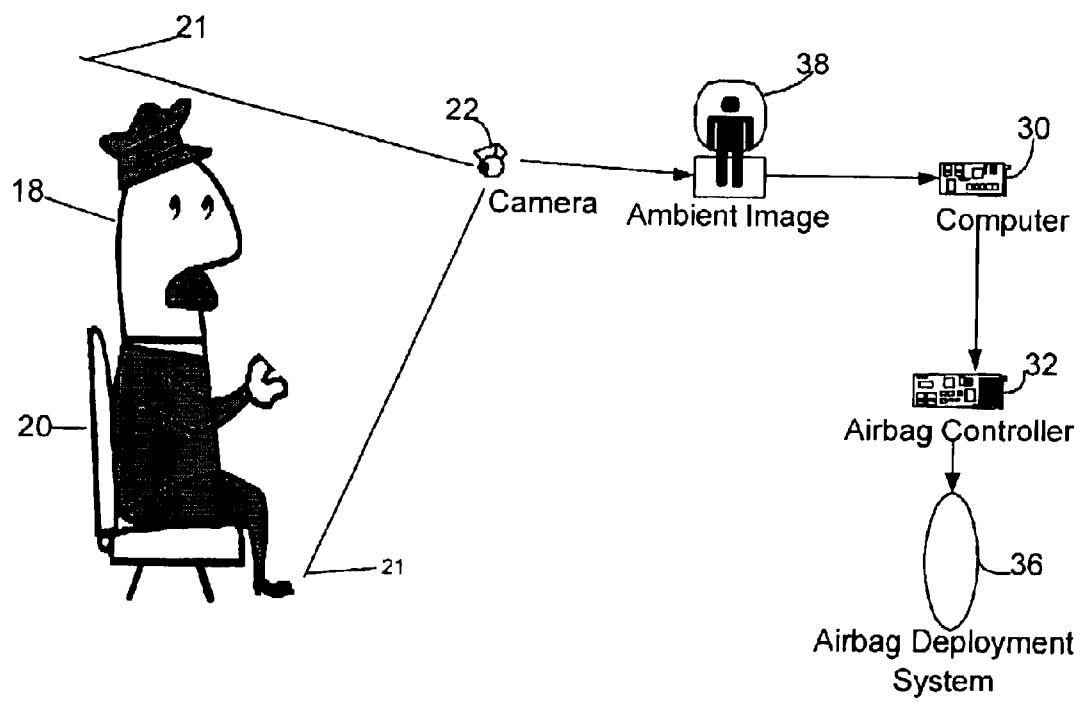
FIG. 2 shows one example of a high-level process flow of a tracking and deployment system that can incorporate the functionality of an occupant labeling system.

FIG. 2 discloses a high-level process flow relating to the use of the system 16 in the context of overall airbag-related processing. An incoming video image ("ambient image") 38 of a seat area 21 includes both the occupant 18 and images in the seat area 21 that surround the occupant 18. The incoming video image 38 is captured by the camera 22 or any other sensor capable of rapidly capturing a series of images. In the Figure, the seat area 21 includes the entire occupant 18, although under some circumstances and embodiments, only a portion of the occupant's 18 image will be captured, particularly if the camera 22 is positioned in a location where the lower extremities may not be viewable. The ambient image 38 is sent to the computer 30.

Many functions in the airbag deployment process can be performed in one or more computers 30. The computer 30 can be used to isolate a segmented image of the occupant 18 from the ambient image 38 of the seat area that includes both the occupant 18 and the area surrounding the occupant 18. The process of identifying the pixels within the segmented that represent the upper torso of the occupant 18 can be housed in the computer 30. The process of extracting occupant characteristics from the upper torso can be performed within the computer. One or more different computers can also be used to: track and predict occupant characteristics; determine whether an incident requiring deployment of an airbag has occurred; determine whether the occupant is too close to the airbag deployment system for a deployment to be desirable (for example, whether the head or upper torso of the occupant would be within a predetermined at-risk-zone (ARZ) at the time of deployment); calculate the desired strength of the deploying airbag; and any other process or analysis relating to the deployment of an airbag. The computer 30 can be any device capable of running a computer program or some other form of structured logic.

Depending on the results of the processing performed by the computer 30, the appropriate instructions can be sent to the airbag controller 32 for implementation by the airbag deployment system 36.

C. Detailed Airbag Process Flow

Figure 3:
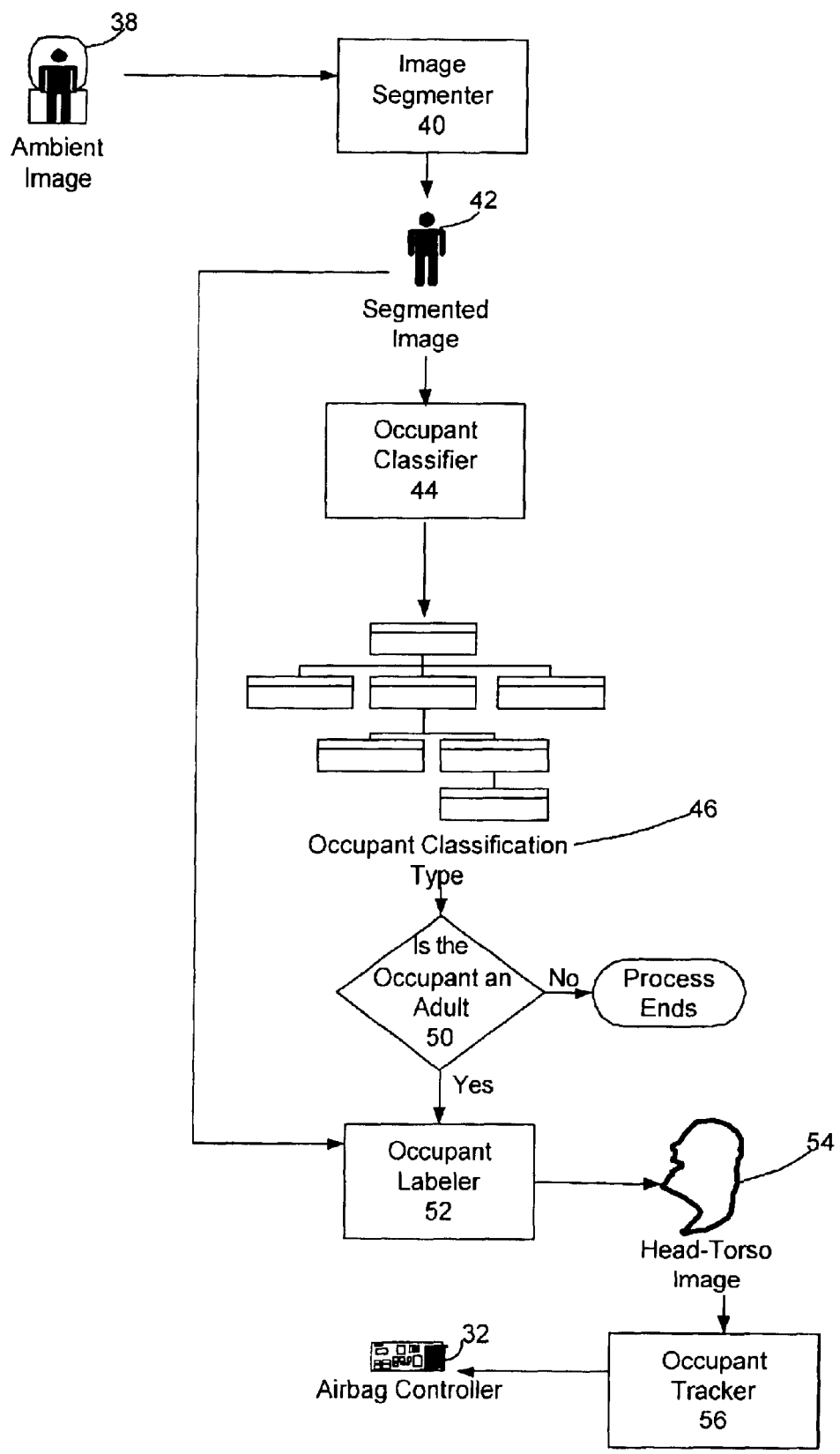
FIG. 3 shows a process flow diagram illustrating one example of how an upper torso image can be captured from a segmented image of an occupant.

FIG. 3 shows a process flow illustrating one example of a process flow from the capturing of an ambient image 38 through the airbag deployment analysis performed by the airbag controller 32.

Each ambient image 38 captured by the camera 22 can be processed by an image segmenter 40. The image segmenter isolates the pixels in the ambient image 38 that represent the occupant 18 so that a segmented image 42 representing only the occupant 18 can be created and passed along for subsequent processing.

The segmented image 42 is an input for an occupant-type classifier ("occupant classifier") 44. The occupant classifier 44 can be configured to classify the segmented image 42 of the occupant 18 into one of several predefined occupant classification types. In a preferred embodiment, the system 16 can distinguish between the following occupant classification types: adult, child, empty, rear facing infant seat, forward facing child seat, and miscellaneous object. Occupant classifiers 44 can use a hierarchy tree of relevant characteristics to identify the correct occupant type classification 46 of the occupant.

In a preferred embodiment, the airbag deployment system 36 precludes deployment of the airbag if the occupant 18 is classified as belonging to a certain classification type 46. In the example in FIG. 3, the airbag can only be deployed if the occupant 18 is classified as an adult. Alternative embodiments can incorporate a wide variety of different deployment rules for various classification types 46. Returning to the example in FIG. 3, if the occupant 18 is not classified as an adult at 50, the process can ends with respect to that particular ambient image 38. The capturing of the next ambient image 38 can restart the process from the beginning.

If the occupant classification type 46 at 50 is a type for which the airbag may need to deploy, an occupant labeling module 52 can take both the segmented image 42 and the occupant type classification 46 as inputs. In alternative embodiments, the occupant classifier 4 is absent, and the occupant labeling module 52 does not have the benefit of an occupant classification type 46.

The occupant labeling module 52 generates a head-torso image 54, which can also be referred to as the upper torso image 54. In a preferred embodiment, the upper torso 54 runs from the hips up through and including the head of the occupant 18. Accordingly, the lower torso runs down from the hips of the occupant 18. In alternative embodiments, the upper and lower torsos can be divided up differently. In alternative embodiments, the segmented image 42 of the occupant 18 can be divided up into three or more sections.

In a preferred embodiment, the upper torso 54 is then sent to the occupant tracker 56. The occupant tracker 56 captures relevant occupant characteristics from the information passed from the occupant labeling module 52. Characteristics used by the occupant tracker 56 can include both measured characteristics and characteristics derived from measured characteristics (derived characteristics). Relevant occupant 18 characteristics can include position, velocity, acceleration, tilt angles, width, height, the location of a centroid, and any other potentially relevant characteristic. In a preferred embodiment, the occupant tracker 56 is an occupant tracker and predictor, utilizing multiple shape and motion models and integrating multiple Kalman filters in a probability weighted analysis to make predictions of future occupant 18 characteristics.

D. Occupant Labeling Heuristic

Figure 4:
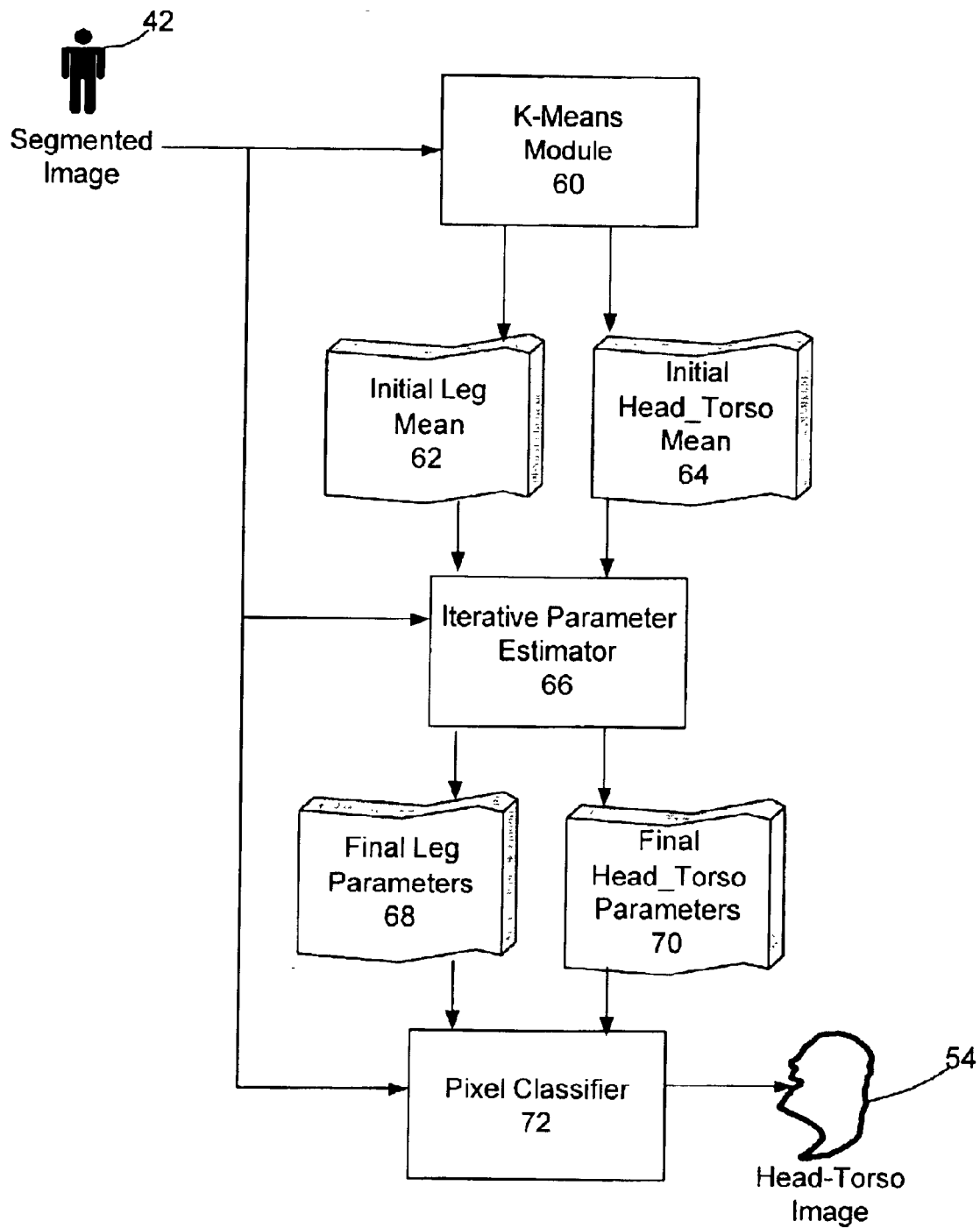
FIG. 4 is a detailed process flow diagram illustrating one example of an occupant labeling heuristic.

FIG. 4 is a detailed process flow of one example of the occupant labeling heuristic. In a preferred embodiment, the inputs to the occupant labeling heuristic are the segmented image 42 and one or more initial guesses about the location of the upper torso 54 (e.g. "head and torso"). The initial guesses can be information about the upper torso 54 that is derived from: anthropological data; vehicle specific data such the characteristics relating to the seat with the system 16 assuming that the occupant 18 is seated; past output from the occupant labeling heuristic (as recent as the last sensor measurement).

A wide variety of different occupant labeling heuristics can be incorporated into the system 16. In a preferred embodiment, the occupant labeling heuristic uses estimates relating to the midpoints of the lower torso (e.g. the legs) and the upper torso (e.g. the occupant 18 from the waist up, including the head). The initial guesses described above, can relate to the locations of the midpoints. Pixels are the fundamental building blocks of visual images, including the ambient image 38, the segmented image 42, and the upper torso image. A wide variety of mathematical operations can be performed relating to a particular pixel's relationship with the estimated midpoint of the upper torso and that same particular pixel's relationship with the estimated midpoint of the lower torso. Distance to the midpoint is a particularly useful relationship, as are the multitude of potential derivations of distance. The system 16 can incorporate a wide variety of occupant labeling heuristics that incorporate the relationship of distance to the midpoint. The system 16 can incorporate a wide variety of occupant labeling heuristics having nothing to do with distance to the midpoint. The system 16 can incorporate a wide variety of occupant labeling heuristics that do not utilize estimated midpoints Similarly, a wide variety of heuristic variations can incorporate dividing the segmented image 42 into more than two parts; using a wide variety of different initial guesses; incorporating other derived data such as occupant classification types 46; and virtually any other potentially relevant characteristic.

1. The k-metric Module and the k-metric Heuristic

In the example illustrated in FIG. 4, segmented image 42 is received by a k-means module 60 capable of performing one or more different k-metric heuristics. In a preferred embodiment, initial guesses (as discussed above) are also incorporated into the processing of the k-means module 60. The k-means module 60 is a subset of potential k-metric modules 60 that can be incorporated into the processing by the occupant labeling heuristic. A k-means module 60 performs a k-means heuristic that utilizes the estimated midpoints of the estimated upper and lower torsos. A k-metric module can use a wide variety of different reference points and mathematical computations.

Figure 5:
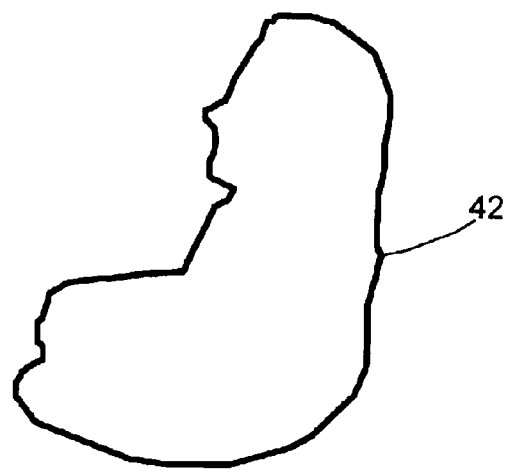
FIG. 5 is a diagram illustrating one example of a segmented image that includes an upper torso and a lower torso.

FIG. 5 is an example of the segmented image 42 that can be received by the k-metric module 60. In a preferred embodiment, the segmented image 42 is a binary image. In some embodiments, all occupant pixels are one binary value with all non-occupant pixels being a different binary value. In alternative embodiments, the border pixels that divide the segmented image 42 from the ambient image 38 are one pixel value, and all other pixels have a different binary value.

Returning to FIG. 4, each pixel in the segmented image 42 of the occupant 18 can be converted into a vector of point coordinates. Each row-column location can be converted in an (x,y) coordinate pair.

In a k-means embodiment of the k-metric module 60, the k-metric module 60 classifies each point (e.g. pixel) in segmented image 42 as being in head_torso_image (e.g. upper torso image) or the leg_image (e.g. lower torso image) according to whether the point is closer to head_torso_mean or leg_mean, the respective midpoints of head_torso_image and leg_image. As discussed above, initial guesses for head_torso_mean and leg_mean can be used to start k-means. In subsequent processing, the next iteration of the k-means heuristic can calculate values for the head_torso_mean and leg_mean by the following or similar formulas:

head_torso_mean=sum(head_torso_image)/# of points in the head_torso_image_ \hfill Equation 1:

leg_mean=sum(leg_image)/# of points in the leg image Equation 2:

The "head_torso_mean" is the previous estimate of the midpoint of the upper torso. In the first iteration, such data can result from an initial guess. The "leg_mean" is the previous estimate of the midpoint of the lower torso, and in the first iteration, such data can result from an initial guess. In a preferred embodiment, the "sum(head_torso_image)" is the sum of all distances between the pixels in the upper torso image and the estimated midpoint of the upper torso image. In alternative embodiments, alternative metrics can be used. Similarly, in a preferred embodiment, the "sum (leg_image)" is the sum of all distances between the pixels in the lower torso image and the estimate midpoint of the lower torso image. In alternative embodiments, alternative metrics can be used. The "# of points in the head_torso_ image" is the number of pixels in the preliminary upper torso image. The "# of points in the leg_image" is the number of pixels in the preliminary lower torso image. Alternative embodiments can implement a wide range of different equations.

2. The Parameter Estimator Module and Heuristic

The initial leg mean (e.g. lower torso mean) 60, the initial head_torso mean (e.g. upper torso mean) 62, and the segmented image 42 can then be sent to a parameter estimator 66. In a preferred embodiment, the parameter estimator 66 is an iterative parameter estimator. The iterative parameter estimator can perform the following for equations in an iterative manner:

Equation 3:

$$\hat{P}(\omega_i | x_k, \theta) = \frac{p(x_k | \omega_i, \hat{\theta}_i)\hat{P}(\omega_i)}{\sum_{j=1}^{c} p(x_k | \omega_j, \hat{\theta}_j)\hat{P}(\omega_j)}$$

$$= \frac{|\sum_{j}|^{-1/2} \exp[-\frac{1}{2}(x_k - \hat{\mu}_i)^t \hat{\sum}_{t}^{-1}(x_k - \hat{\mu}_i)]\hat{P}(\omega_t)}{\sum_{j=1}^{c} |\sum_{j}|^{-1/2} \exp[-\frac{1}{2}(x_k - \hat{\mu}_i)^t \hat{\sum}_{t}^{-1}(x_k - \hat{\mu}_i)]\hat{P}(\omega_t)}$$

$\hat{P}(\omega_i|x_k,\theta)$ represents the probability of a particular pixel ($x_k$) being in particular class ($\omega_i$) such as an upper torso class or a lower torso class, given statistics $\theta$. For each class i, $\mu$ represents the mean value (such as the head_torso_mean and the leg_mean or lower_torso_mean). The initial value of $\Sigma_i$ represents the covariance for each particular class i. The covariance determines roughly a bounding ellipse of the occupant's upper torso, a shape that can be determined using anthropomorphic data. Equation 3 is first solved using initial guesses for $\theta$, where $\theta=\mu, \Sigma$. The initial value of $\mu$ comes from the output of the k-means heuristic discussed above. Equation 4, Equation 5, and Equation 6 are iterative inputs to Equation 3 after Equation 3 is first solved using the initial guesses.

Equation 4:

$$\hat{P}(\omega_i) = \frac{1}{n}\sum_{k=1}^{n} \hat{P}(\omega_i | x_k, \theta)$$

The variable n represents the number of pixels in the segmented image 42.

Equation 5:

$$\hat{\mu}_i = \frac{\sum_{k=1}^{n} \hat{P}(\omega_i | x_k, \theta) x_k}{\sum_{k=1}^{n} \hat{P}(\omega_i | x_k, \theta)}$$

Equation 6:

$$\hat{\sum}_i = \frac{\sum_{k=1}^{n} \hat{P}(\omega_i | x_k, \theta)(x_k - \hat{\mu}_i)(x_k - \hat{\mu}_i)^t}{\sum_{k=1}^{n} \hat{P}(\omega_i | x_k, \theta)}$$

In these equations the head_torso_mean (e.g. upper torso mean or midpoint) and the leg_mean (e.g. lower torso mean or midpoint) are represented by the Greek letter $\mu_i$ and the covariances are represented by the Greek letter $\Sigma_i$. $\omega_i$ is the class of each coordinate $x_k$ in segmented image. i=1,2, and c=2 for a two class problem (the two classes are the head-torso and the legs). In alternative embodiments, c can be greater than 2. $\omega_1$ represents the coordinate $x_k$ being in the leg class and $\omega_2$ represents $x_k$ being in the head-torso class.

Thus $\hat{P}(\omega_i|x_k,\theta)$ (one example of a type of "conditional likelihood heuristic") is the conditional likelihood of $x_k$ being in class $\omega_i$ given statistics, $\theta$. Equation 3 is solved first using initial guesses for $\theta$ where $\theta = \mu, \Sigma$. The initial $\mu$, comes from the output of "k-means. Anthropomorphic information is used since the upper torso (including the head) of an adult human is usually roughly ⅔ of the overall mass of the adult. So the initial guess for the apriori probabilities can be determined based on this. The initial covariances are educated assumptions (e.g. guesses), based upon the size of the segmented image and the equivalent anthropomorphic information regarding the general shape of the upper body. The covariance determines roughly a bounding ellipse of the occupant head-torso (e.g. upper torso) and it is known from the anthropomorphic data what this shape generally is. As discussed above, there are a wide variety of different heuristics and equations that can be incorporated into parameter estimator 66.

Figure 6:
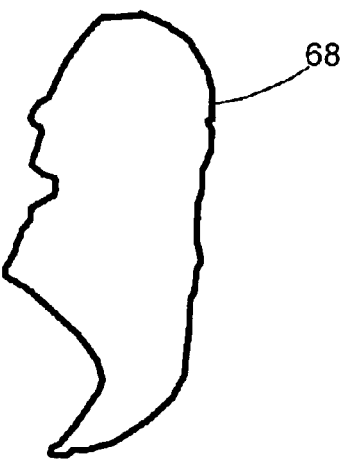
FIG. 6 is a diagram illustrating one example of an upper torso image that has been isolated from the lower torso image of a segmented occupant image.
Figure 7:
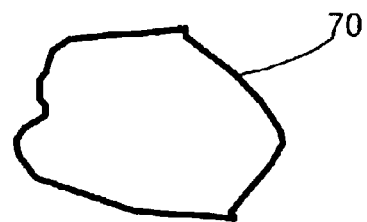
FIG. 7 is a diagram illustrating one example of a lower torso image that has been removed from the segmented image of the occupant in order to facilitate the identification of an upper torso image.

Equations 3, 4, 5, and 6 can be performed in an iterative manner. The equations can be repeated a fixed number of times, with that fixed number being set in advance at the time that the system 16 is configured. The number of iterations can also be determined by comparing the change in the mean values with a significant change threshold value. The system 16 can be configured to repeat the parameter estimator heuristic for a particular segmented image 42 until the change in mean values are less than the significant change threshold value. Other embodiments may incorporate both approaches, using a significant change threshold value, but setting a finite limit to the number of potential iterations. FIG. 6 illustrates one example of a final head_torso parameters 70 output from the parameter estimator heuristic. FIG. 7 illustrates one example of a final leg parameters 68 output from the parameter estimator heuristic.

3. Pixel Classification Module and Pixel Classification Heuristic

Returning to FIG. 4, the inputs to a pixel classification module 72 are preferably the final head_torso parameter 70 and the final leg parameter 68 from the parameter estimator heuristic. The inputs should also include the segmented image 42 processed already by the k-metric module 60 and the parameter estimator 66.

The pixel classification module 72 can perform a pixel characteristic heuristic which includes a distance heuristic. Distance heuristics classify a pixel based on the distances from a particular pixel to reference points (such as midpoints) in the various sections of the segmented image 42 (such as upper torso and the lower torso). If the distance to the upper torso is lower for a particular pixel, then the pixel is classified an upper torso pixel. Similarly, if the distance to the lower torso is lower for a particular pixel, then the pixel is classified as a lower torso pixel. In the case of a tie, the system 16 can be configured to classify the pixel as either an upper torso pixel or a lower torso pixel.

A preferred embodiment of the system 16 performs a Mahalanobis heuristic. The Mahalanobis heuristic calculates the "Mahalanobis" distance of each point in seg_image to the head_torso_mean (e.g. upper torso midpoint) and the leg_mean (e.g. lower torso midpoint). If the Mahalanobis distance of a point (e.g. pixel) is closer to head_torso_mean (upper torso midpoint), then that point is classified as head_torso_image (upper torso pixel), otherwise the point can be classified as leg_image (lower torso pixel). Mahalanobis distance between two points is defined in Equation 7::

$$d = (x_k - \hat{\mu}_i)^t \hat{\sum}_i^{-1} (x_k - \hat{\mu}_i)$$

In the above equation, $x_k$ are the points in seg_image and $\mu_i$ and $\Sigma_i$ are outputs of the parameter estimator 66.

The pixel classifier can thus set each pixel in the segmented image in accordance with a final classification from the classification heuristic. The final head_torso (e.g. upper torso) image 54 can then be sent to occupant tracker module 56 described above so that the airbag deployment system 36 can make the appropriate deployment decision.

In accordance with the provisions of the patent statutes, the principles and modes of operation of this invention have been explained and illustrated in multiple preferred and alternative embodiments. However, it must be understood that this invention may be practiced otherwise than is specifically explained and illustrated without departing from its spirit or scope.

What is claimed is:

1. An occupant labeling system for identifying the upper torso of the occupant, comprising:
    a k-metric module, including an upper torso metric and a lower torso metric, wherein said k-metric module provides for generating said upper torso metric and said lower torso metric; and
    a parameter estimator, including an upper torso parameter and a lower torso parameter, wherein said parameter estimator provides for generating said upper torso parameter and said lower torso parameter from said upper torso metric and said lower torso metric.

2. The occupant labeling system of claim 1, wherein said k-metric module is a k-means module, wherein said upper torso metric is an upper torso mean, and wherein said lower torso metric is a lower torso mean.

3. The occupant labeling system of claim 1, further comprising a segmented image, wherein said k-metric module provides for generating said upper torso metric and said lower torso metric from said segmented image.

4. The occupant labeling system of claim 1, further comprising an initial guess, wherein said k-metric module provides for generating said upper torso metric and said lower torso metric with said initial guess.

5. The occupant labeling system of claim 4, wherein said initial guess is based on a location of a seat.

6. The occupant labeling system of claim 4, wherein said initial guess is based on an anthropomorphic characteristic.

7. The occupant labeling system of claim 1, wherein said k-metric module further includes an occupant classification, and wherein said k-metric selectively generates said upper torso metric and said lower torso metric with said occupant classification.

8. The occupant labeling system of claim 1, said parameter estimator further including a bounding ellipse.

9. The occupant labeling system of claim 1, said parameter estimator further including a Mahalanobis distance.

10. The occupant labeling system of claim 1, wherein said parameter estimator is an iterative parameter estimator.

11. The occupant labeling system of claim 10, wherein said iterative parameter estimator performs a predetermined number of iterations.

12. The occupant labeling system of claim 10, said iterative parameter estimator including a predetermined significant change threshold and a change in metric values, wherein said iterative parameter estimator ceases performing additional iterations when said change in metric values is exceeded by said predetermined significant change threshold.

13. The occupant labeling system of claim 1, further comprising a pixel classifier and a upper torso image, wherein said pixel classifier generates said upper torso image from said upper torso parameter and said lower torso parameter.

14. An occupant labeling system for identifying the upper torso of the occupant, comprising:
a k-means module, including a segmented image, an initial guess, an upper torso mean, and a lower torso mean, wherein said k-means module provides for generating said upper torso mean and said lower torso mean with said segmented image and said initial guess;
an iterative parameter estimator, including an upper torso parameter, a lower torso parameter, and a Mahalanobis distance, wherein said iterative parameter estimator provides for generating said upper torso parameter and said lower torso parameter with said Mahalanobis distance, said upper torso mean, and said lower torso mean; and
a pixel classifier, including an upper torso image, wherein said pixel classifer generates said upper torso image from said upper torso parameter and said lower torso parameter.

15. The occupant labeling system of claim 14, further comprising a number of iterations, wherein said iterative parameter estimator provides for iteratively generating in accordance with said number of iterations, said upper torso parameter and said lower torso parameter.

16. The occupant labeling system of claim 15, wherein said number of iterations is predetermined and fixed.

17. The occupant labeling system of claim 15, further comprising a change threshold and a mean value, wherein said number of iterations is determined by comparing said change threshold with said mean value.

18. An occupant tracking and airbag deployment system comprising:
an image segmenter, including an ambient image and a segmented image, wherein said image segmenter generates said segmented image from said ambient image;
an image classifier, including an occupant type classification, wherein said image classifier generates said occupant type classification from said segmented image; and
an occupant labeler, including an upper torso image and a occupant labeling heuristic, wherein said occupant labeler generates said upper torso image from said segmented image, said occupant labeling heuristic, and said occupant type classification.

19. The occupant tracking and airbag deployment system of claim 18, further comprising a tracking subsystem, wherein said tracking subsystem includes an occupant characteristic, and wherein said tracking subsystem generates said occupant characteristic from said upper torso image.

20. The occupant tracking and airbag deployment system of claim 19, wherein said tracking subsystem further includes a deployment decision, and wherein said tracking subsystem generates said deployment decision from said occupant characteristic.

21. A method for identifying the upper torso of an occupant from a segmented image of occupant pixels, comprising:
determining the distance of a pixel to an estimated midpoint on the upper torso;
updating the estimated midpoint of the upper torso; and
selectively identifying an upper torso pixel with the updated estimated midpoint.

22. The method of claim 21, said selectively identifying an upper torso pixel including calculating a upper torso Malanobis distance between the upper torso pixel and an upper torso midpoint.

23. The method of claim 22, further comprising computing a lower torso Malanobis distance between a lower torso pixel and a lower torso midpoint.

24. The method of claim 23, further comprising comparing said upper torso Malanobis distance with said lower torso Malanobis distance.

25. The method of claim 21, wherein said updating the estimated midpoint includes referencing an anthropomorphic characteristic.

* * * * *